E. LÜBECK.
LOOM SHUTTLE.
APPLICATION FILED APR. 15, 1911.

1,019,977.

Patented Mar. 12, 1912.

WITNESSES
Chas. J. Wright
Alfred Henkel

INVENTOR
Emil Lübeck

UNITED STATES PATENT OFFICE.

EMIL LÜBECK, OF BARMEN, GERMANY.

LOOM-SHUTTLE.

1,019,977. Specification of Letters Patent. Patented Mar. 12, 1912.

Application filed April 15, 1911. Serial No. 621,390.

*To all whom it may concern:*

Be it known that I, EMIL LÜBECK, a subject of the Emperor of Germany, residing at 182 Heckinghauserstrasse, Barmen, Germany, have invented certain new and useful Improvements in Loom-Shuttles, of which the following is a specification.

This invention relates to loom shuttles and more particularly to loom swivels or small ware shuttles provided with tension springs capable of being drawn in and out of the shuttle body. The connection of the ends of these springs in the shuttle body must be easily detachable, since the springs require frequent renewal or adjustment of their tension according to the goods to be produced, either by shortening or stretching the springs. Hitherto the attachment of these springs has been effected by clamping the end of each spring by means of a wooden plug driven into the passage terminal on the rear face of the shuttle. Now with this arrangement, in order to detach the springs the wooden plug has to be withdrawn by means of a pointed tool, whereby the terminal of the bore or passage is subjected to being enlarged and moreover damage to the shuttle cannot be avoided. Moreover where the plug has been driven in too far its removal requires boring out which is a most inconvenient operation connected with great loss of time. These drawbacks are avoided according to the present invention by the provision on the rear face of the shuttle at the point at which the spring passage terminates of a device enabling the end of the spring to be readily attached and detached.

The drawings illustrate one constructional example of the invention.

Figure 1:
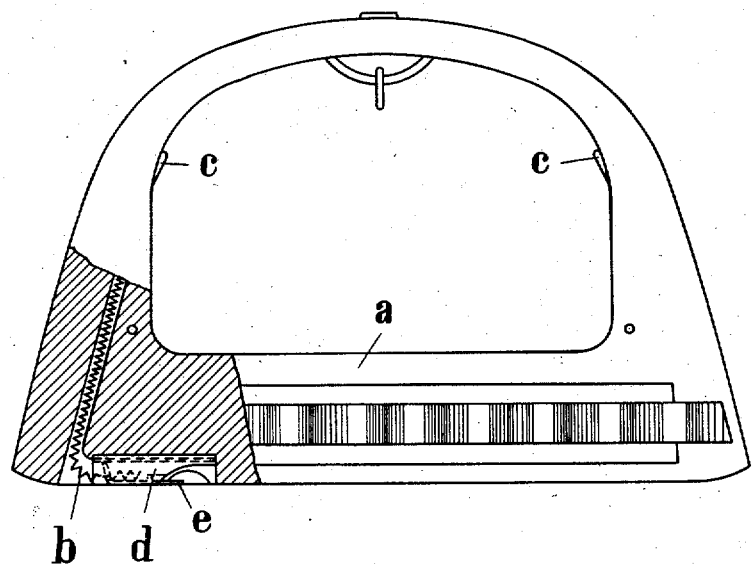
Figure 2:
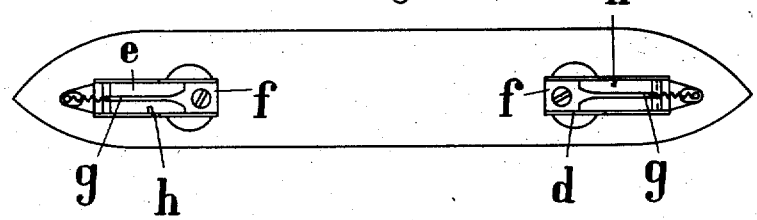

Figure 1 shows a partial view and partial cross-section of a small ware shuttle and its tension springs, but not showing the other parts. Fig. 2 is a top plan view of Fig. 1, and Figs. 3 to 5 show in detail the device for fixing the ends of the springs according to the present invention.

Figure 3:
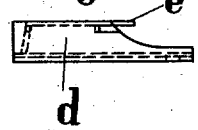
Figure 4:
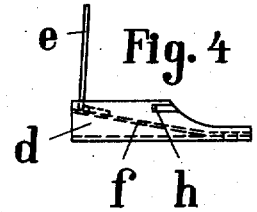
Figure 5:
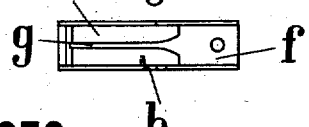

In the body of the shuttle $a$, Fig. 1, on the left hand side, is shown the bore adapted to receive the spring $b$ and terminating at its upper end in an eye $c$. In order to secure the lower end of the spring $b$ a housing $d$ is embedded in a recess of the shuttle body. This housing is provided with a detent $e$ which is under the influence of a small flat spring $f$, by which the detent is secured either in raised position (Fig. 4) or in shut down position (Figs. 1, 3 and 5). The detent $e$ has a longitudinal slot $g$ for the insertion of the end of the wire spring which end is inserted in the slot when the detent is raised (Fig. 4) after which the detent is shut down, whereby the end of the wire is bent over. It should be noted that the wire is thin brass wire. In the shut down position the detent must not protrude, and a stop $h$ (Fig. 3) is arranged in the casing $d$ to prevent the detent from being pressed in too far.

It is of course understood that constructionally the device is capable of various modifications.

An advantage must be seen in the fact that in exchanging the springs the shuttles need not be withdraw from the shuttle shed during the working, which cannot be avoided if the springs are attached by plugs as hitherto.

What I claim and desire to secure by Letters Patent is:—

1. In a loom shuttle a device for attaching the ends of the tension springs comprising in combination a housing embedded in a recess of the shuttle body, a movable detent, slotted for the insertion of the end of the spring and a spring adapted to hold the detent in either a raised or a depressed position, all substantially as described.

2. In a loom shuttle a device for attaching the ends of the tension springs comprising in combination a housing embedded in a recess of the shuttle body, a movable detent with a slot for the insertion of the end of the spring, a spring adapted to hold the detent in either a raised or a depressed position and a stop for limiting the inward movement of the detent all substantially as described.

In testimony whereof, I affix my signature in presence of two witnesses.

EMIL LÜBECK. [L. S.]

Witnesses:
CHAS. J. WRIGHT,
ALFRED HENKEL.